(12) United States Patent  
Saruwatari

(10) Patent No.: US 7,019,911 B2  
(45) Date of Patent: Mar. 28, 2006

(54) ZOOM LENS SYSTEM AND IMAGE PICKUP APPARATUS HAVING THE SAME

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/139,868

(22) Filed: May 27, 2005

(65) Prior Publication Data

US 2005/0270662 A1    Dec. 8, 2005

(30) Foreign Application Priority Data

Jun. 4, 2004    (JP)    ............................. 2004-167214

(51) Int. Cl.  
G02B 15/14    (2006.01)

(52) U.S. Cl. .......................... 359/680; 359/689

(58) Field of Classification Search ........ 359/680–682, 359/689  
See application file for complete search history.

(56) References Cited

U.S. PATENT DOCUMENTS

| 4,647,160 A | 3/1987 | Ikemori | 359/680 |
| 4,810,072 A * | 3/1989 | Takahashi | 359/689 |
| 4,810,078 A | 3/1989 | Armstrong | 359/610 |
| 4,838,666 A | 6/1989 | Shiraishi | 359/689 |
| 4,999,007 A | 3/1991 | Aoki et al. | 359/676 |
| 5,270,863 A | 12/1993 | Uzawa | 359/682 |
| 5,909,318 A * | 6/1999 | Tanaka | 359/689 |
| 6,124,984 A | 9/2000 | Shibayama et al. | 359/689 |
| 6,308,011 B1 | 10/2001 | Wachi et al. | 396/72 |
| 6,498,687 B1 | 12/2002 | Sekita et al. | 359/680 |
| 6,611,386 B1 * | 8/2003 | Tanaka | 359/689 |

FOREIGN PATENT DOCUMENTS

| JP | 63-135913 | 6/1988 |
| JP | 3-288113 | 12/1991 |
| JP | 6-40170 | 2/1994 |
| JP | 7-3507 | 1/1995 |
| JP | 7-261083 | 10/1995 |
| JP | 11-23967 | 1/1999 |
| JP | 11-287953 | 10/1999 |
| JP | 2001-296475 | 10/2001 |

* cited by examiner

Primary Examiner—Ricky L. Mack  
Assistant Examiner—M. Hasan  
(74) Attorney, Agent, or Firm—Morgan & Finnegan, L.L.P.

(57) ABSTRACT

Disclosed is a zoom lens system including in an order from an object side to an image side: a first lens unit having a negative refractive power; a second lens unit having a positive refractive power; and a third lens unit having a positive refractive power, in which zooming is performed by changing each distance among the first, second, and third lens units. In this zoom lens system, partial charge of a changing magnification between the second and third lens units is suitably set to maintain excellent optical performance over the overall zoom area while a zoom ratio is large.

9 Claims, 9 Drawing Sheets

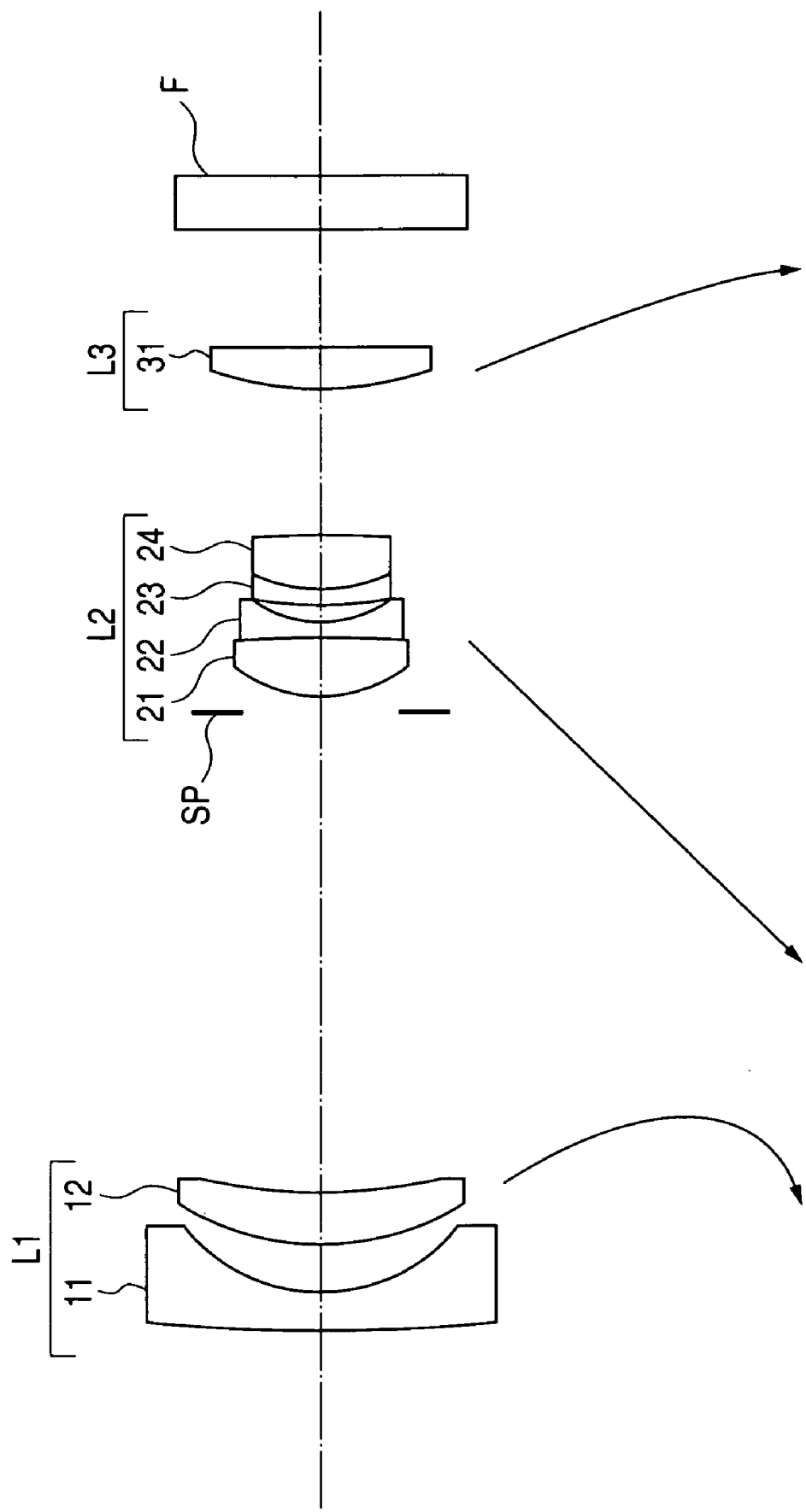

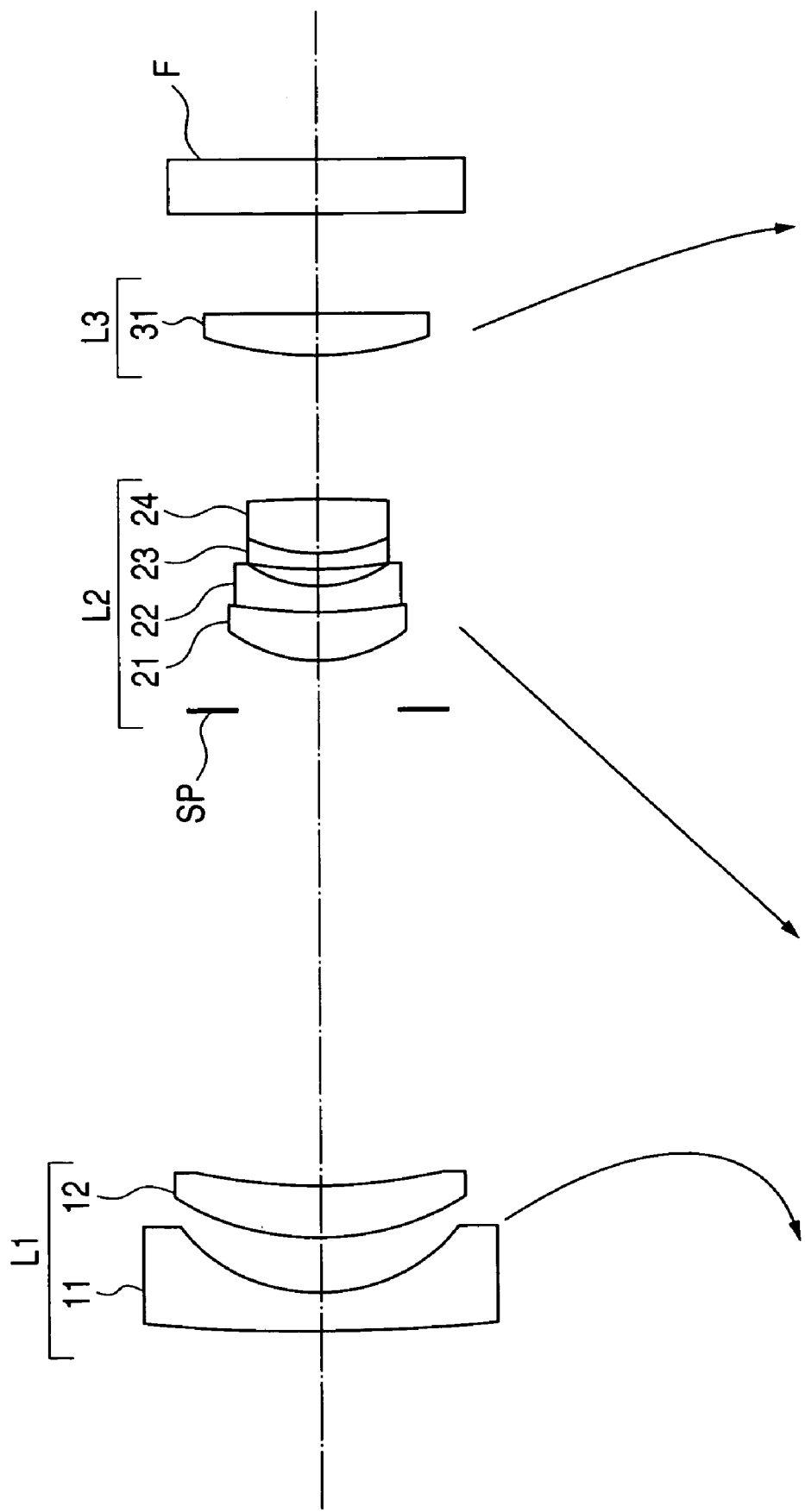

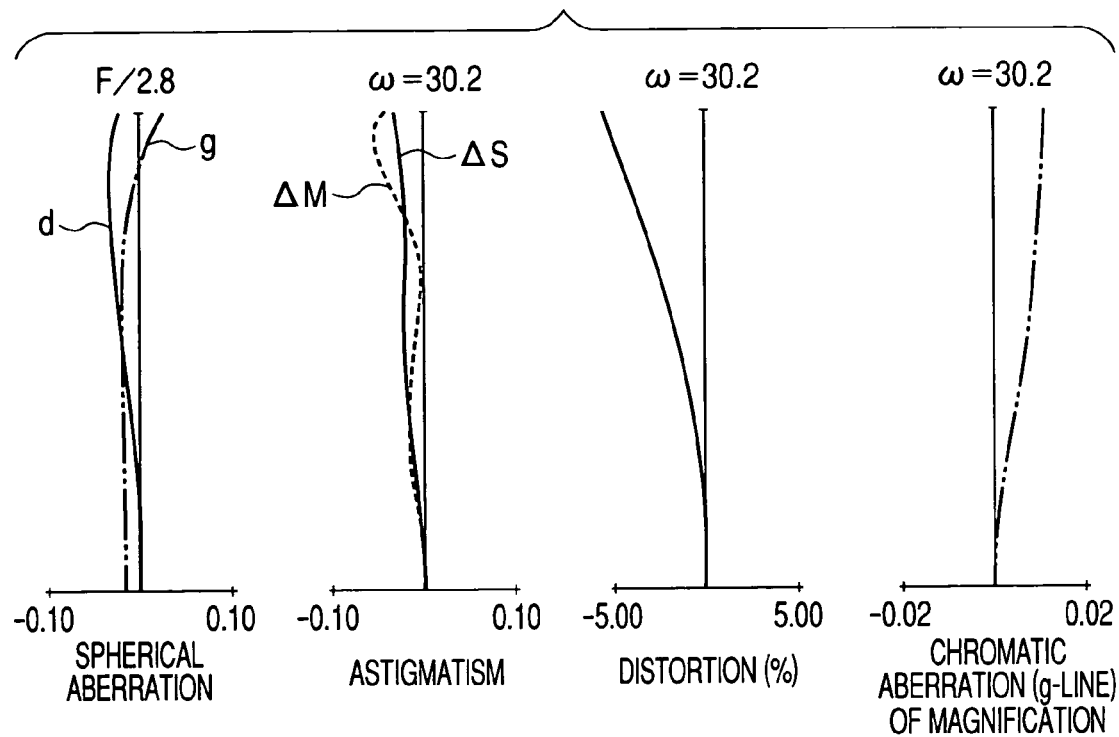
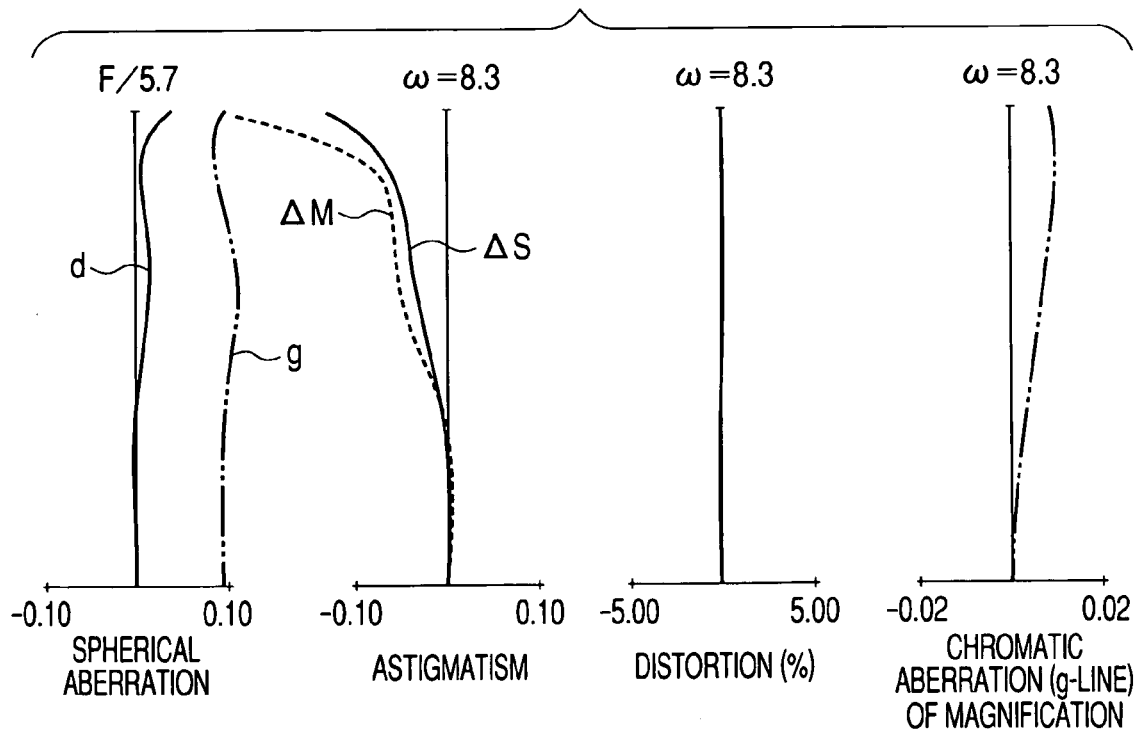

ZOOM LENS SYSTEM AND IMAGE PICKUP APPARATUS HAVING THE SAME

BACKGROUND OF THE INVENTION

1. Field of the Invention

The present invention relates to a zoom lens system, which is suitable for an image taking optical system of a digital still camera for example.

2. Related Background Art

In recent years, along with promotion of high performance image pickup apparatus (camera) such as a video camera or a digital still camera using a solid-state image pickup element such as a CCD sensor or a CMOS sensor, a zoom lens having a large aperture ratio including a wide angle of view is required for an image taking optical system used in the image pickup apparatus.

In a camera of this sort, various kinds of optical components such as an optical low-pass filter and a color correction filter are disposed between a lens rear end portion and an image pickup element. Hence, a lens system having a relatively long back focus is required for an image taking optical system used in that camera. Moreover, in a case of a color camera using an image pickup element for a color image, in order to avoid color shading, an optical system which has excellent telecentric characteristics on an image side is desired as an optical system used in the color camera.

Heretofore, there have been proposed various two-unit zoom lenses of a so-called short zoom type. Such a two-unit zoom lens includes a first lens unit having a negative refractive power and a second lens unit having a positive refractive power and carries out zooming while a lens distance between the first and second lens units is changed. In those zoom lenses of the short zoom type, a changing magnification is carried out by moving the second lend unit having the positive refractive power, and compensation for an image position accompanying the changing magnification is carried out by moving the first lens unit having the negative refractive power. In a lens construction including those two lens units, a zoom ratio is about 2.

In order to make the overall lens compact while a high zoom ratio equal to or larger than 2 is maintained, a so-called three-unit zoom lens in which a third lens unit having a negative or positive refractive power is disposed on an image side of the second-unit zoom lens to carry out various aberrations generated due to an increase in the zoom ratio is proposed in JP 7-3507 B or JP 6-40170 B for example.

The three-unit zoom lens fulfilling the back focus and the telecentric characteristics is proposed in Japanese Patent Application Laid-Open No. S63-135913 or Japanese Patent Application Laid-Open No. H07-261083 for example. In addition, Japanese Patent Application Laid-Open No. H03-288113 discloses an optical system in which the first lens unit having the negative refractive power is fixed in the three-unit zoom lens, and the zooming operation is carried out by moving the second lens unit having the positive refractive power and the third lens unit having the positive refractive power. Likewise, the three-unit zoom lenses are also disclosed in Japanese Patent Application Laid-Open No. H07-261083, U.S. Pat. No. 4,999,007, Japanese Patent Application Laid-Open No. H11-23967, Japanese Patent Application Laid-Open No. H11-287953, and Japanese Patent Application Laid-Open No. 2001-296475.

The three-unit zoom lens disclosed in JP 7-3507 B or JP 6-40170 B is mainly designed for 35-mm film photography. Hence, it is hardly to say that the length of the back focus and the excellent telecentric characteristics which are required for the optical system using the solid-state image pickup element are compatible with each other.

In the case of the zoom lens disclosed in Japanese Patent Application Laid-Open No. S63-135913, Japanese Patent Application Laid-Open No. H07-261083, or Japanese Patent Application Laid-Open No. H03-288113, since the number of elements of lenses constituting each of the lens units is relatively large, a total lens length is long, and manufacturing cost is high.

Moreover, in the zoom lens disclosed in Japanese Patent Application Laid-Open No. H07-261083, a positive lens is disposed in a position nearest an object side of the first lens unit having the negative refractive power. Thus, in particular, when an angle of view is increased, the zoom lens tends to increase a lens outer diameter. Furthermore, this example often complicates a mechanical construction combined with the movement during the zooming operation since the focusing for a neat object is carried out by moving the first lens unit having the negative refractive power.

Though the zoom lens disclosed in U.S. Pat. No. 4,999,007 has a simple construction in which each of the first and second lens units is constituted by one element of single lens, a total lens length in a wide angle end is relatively long. Moreover, since the first lens unit and an aperture stop are largely distant from each other in the wide angle end, an incident height of an off axis principal ray is large and hence a diameter of each of the lenses constituting the first lens unit is increased. For this reason, the zoom lens easily scales up a construction of the overall lens system.

The zoom lens disclosed in Japanese Patent Application Laid-Open No. H11-23967 A has the zoom ratio equal to or larger than 2.5. However, since an exit pupil distance enough to be suitable for the solid-state image pickup element is secured after sufficient optical performance is ensured from a wide angle end to a telephoto end, it is hardly to mention that the sufficient compactness is made in terms of a total lens length.

In the zoom lens disclosed in Japanese Patent Application Laid-Open No. H11-287953, each of the first and second lens units is constituted by three elements of single lens, thereby realizing compactness. Also, in the zoom lens disclosed in Japanese Patent Application Laid-Open No. 2001-296475, the first lens unit is constituted by two elements of lenses, thereby realizing further compactness. However, either of those zoom lenses has the zoom ratio of about 3. The above documents hence do not disclose preferable constructions when the higher zoom ratio is to be realized.

SUMMARY OF THE INVENTION

The present invention has been made on the basis of those conventional examples, and it is, therefore, an object of the present invention to provide a zoom lens which is capable of maintaining excellent optical performance over the overall zoom area even when a larger zoom ratio is realized without increasing the number of elements of constituent lenses.

An exemplary zoom lens system for attaining the above-mentioned object include in an order from an object side to an image side: a first lens unit having a negative refractive power (a refractive power is an optical power, i.e., an inverse number of a focal length); a second lens unit having a positive refractive power; and a third lens unit having a positive refractive power, in which zooming is carried out by changing each distance among the first to third lens units. When in the zoom lens system, a ratio of an imaging magnification of the second lens unit in a telephoto end to an imaging magnification of the second lens unit in a wide angle end is $\beta_{2z}$, and a ratio of an imaging magnification of the third lens unit in a telephoto end to an imaging magnification of the third lens unit in a wide angle end is $\beta_{3z}$, partial charge of a changing magnification between the second lens unit and the third lens unit is suitably set to fulfill a following relationship:

$$2.6<\beta_{2z}/\beta_{3z}<3.5$$

BRIEF DESCRIPTION OF THE DRAWINGS

FIG. 1 is a cross sectional view of a zoom lens according to Embodiment 1 of the present invention;

FIG. 3 is a cross sectional view of a zoom lens according to Embodiment 2 of the present invention;

FIGS. 4A and 4B are diagrams showing various aberrations in the zoom lens according to Embodiment 2 of the present invention;

DESCRIPTION OF THE PREFERRED EMBODIMENTS

Figure 2A:
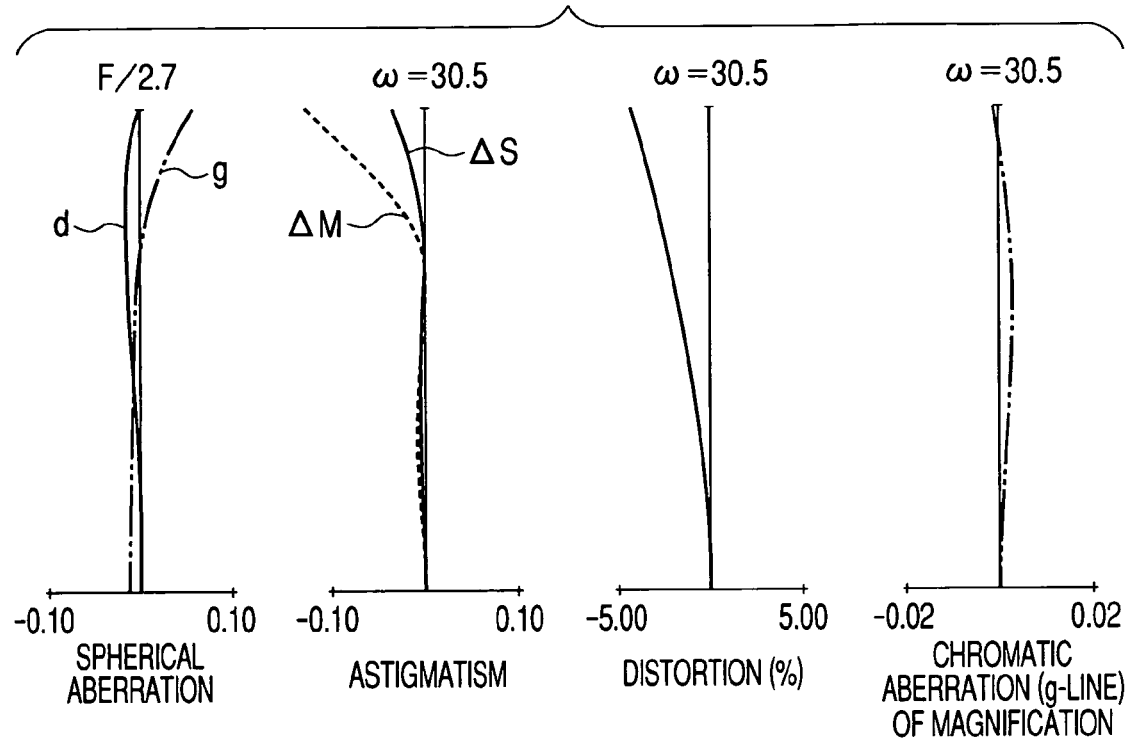
FIGS. 2A and 2B are diagrams showing various aberrations in the zoom lens according to Embodiment 1 of the present invention.
Figure 2B:
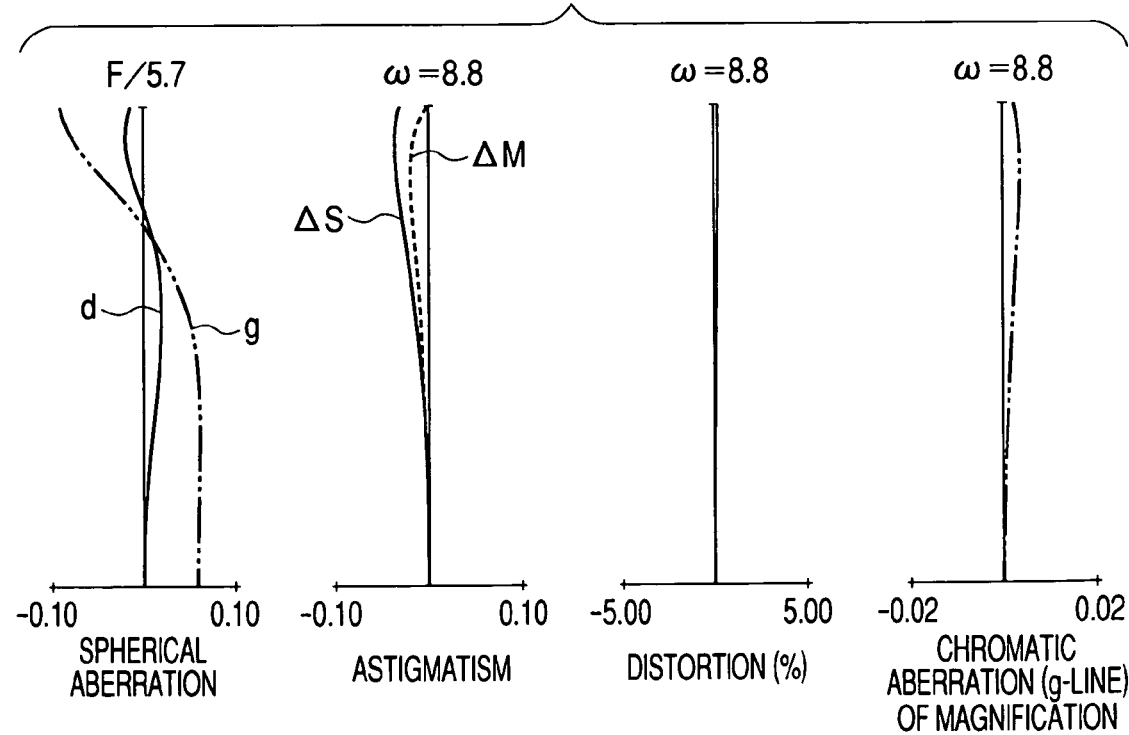

Embodiments of a zoom lens system of the present invention will hereinafter be described in detail with reference to the accompanying drawings. A zoom lens disclosed in each of the embodiments is an image taking optical system for an image pickup apparatus such as a digital still camera for forming a object image on a solid-state image pickup element (photoelectric conversion element) such as a CCD sensor or a CMOS sensor.

FIGS. 1, 3, 5, and 7 are cross sectional views in wide angle ends of zoom lenses according to Embodiments 1, 2, 3, and 4 of the present invention, respectively. FIGS. 2A and 2B, FIGS. 4A and 4B, FIGS. 6A and 6B, and FIGS. 8A and 8B are aberration diagrams of the zoom lenses according to Embodiments 1, 2, 3, and 4 of the present invention, respectively. Then, FIG. 2A, FIG. 4A, FIG. 6A, and FIG. 8A show states of the wide angle ends of the zoom lenses, and FIG. 2B, FIG. 4B, FIG. 6B, and FIG. 8B show states of telephoto ends of the zoom lenses.

In each of the cross sectional views of FIGS. 1, 3, 5, and 7, a left-hand side is an object side (front side), and a right-hand side is an image side (rear side). In those drawings, reference symbol L1 designates a first lens unit having a negative refractive power (an optical power=an inverse number of a focal length), reference symbol L2 designates a second lens unit having a positive refractive power, and reference symbol L3 designates a third lens unit having a positive refractive power. Reference symbol SP designates an aperture stop, reference symbol F designates a glass block which is provided in design in correspondence to parallel plates such as an optical low-pass filter, an infrared cut filter, and a cover glass which exist in an optical path.

In each of the aberration diagrams, reference symbols d and g designate a d line and a g line, respectively, reference symbol $\Delta M$ designates a meridional image surface, and reference symbol AS designates a sagittal image surface. A chromatic aberration of magnification (lateral chromatic aberration) is expressed by the g line.

In the zoom lens of each of Embodiments 1 to 4, when the zooming from the wide angle end to the telephoto end is carried out, the first lens unit L1 moves to draw a part of a locus convex toward the image side, the second lens unit L2 moves to the object side, and the third lens unit L3 moves to the image side.

In the zoom lens of each of Embodiments 1 to 4, the main changing magnification is carried out based on the movement of the second lens unit L2, and the movement of an image position accompanying the changing magnification is compensated based on a nearly reciprocating motion of the first lens unit L1 and the movement of the third lens unit L3 toward the image side.

The third lens unit L3 is used in order to take partial charge of an increase in refractive power of an image taking lens accompanying miniaturization of an image pickup element to reduce the refractive power of a short zoom system constituted by the first and second lens units L1 and L2 to especially suppress the generation of the aberrations in the lenses constituting the first lens unit L1, thereby attaining the excellent optical performance. Also, in particular, the telecentric image formation on the image side necessary for an image taking apparatus using a solid-state image pickup element or the like is attained by making the third lens unit L3 function as a field lens.

In addition, in Embodiments 1 to 3, the aperture stop SP is disposed in a position nearest the object side of the second lens unit L2 to shorten a distance between the entrance pupil on the wide angle side and the first lens unit L1, thereby suppressing an increase in outer diameter of each of the lenses constituting the first lens unit L1. Moreover, the first and third lens units L1 and L3 sandwiching the aperture stop SP between them are caused to operate to cancel the off axis aberrations each other, thereby obtaining the excellent optical performance without increasing the number of elements of constituent lenses.

On the other hand, in Embodiment 4, the aperture stop SP is disposed within the second lens unit L2, and a positive lens having a convex-like shape on the object side is disposed on the object side, whereby it becomes possible to extremely reduce a distance on an optical axis in the telephoto end between the first and second lens units L1 and L2. As a result, it becomes possible to reduce a diameter of a front lens as well as to shorten the total length.

In the zoom lens of each of Embodiments 1 to 4, the first lens unit L1 has at least one element of negative lens and one element of positive lens, the second lens unit L2 has a cemented lens which is obtained by bonding a positive lens and a negative lens disposed on an image side of the positive lens to each other, and the third lens unit L3 has at least one element of positive lens.

Next, concrete lens constructions of the zoom lenses of Embodiments 1 to 4 will be described.

In the zoom lens of Embodiment 1 shown in FIG. 1, the first lens unit L1 having the negative refractive power is constituted by two elements of lenses, i.e., a meniscus-shaped negative lens 11 having a concave surface directed to the image side, and a meniscus-shaped positive lens 12 having a convex surface directed to the object side which are disposed in this order from the object side to the image side. The second lens unit L2 having the positive refractive power is constituted by four elements of lenses, i.e., a positive lens 21 having convex shapes on its both lens surfaces, a negative lens 22 having concave shapes on its both lens surfaces, a meniscus-shaped negative lens 23 having a convex surface directed to the object side, and a positive lens 24 having convex shapes on its both lens surfaces which are disposed in this order from the object side to the image side. Then, the positive lens 21 and the negative lens 22 are bonded into a cemented lens, and the negative lens 23 and the positive lens 24 are bonded into a cemented lens. The third lens unit L3 having the positive refractive power is constituted by a positive lens 31 having convex shapes on its both lens surfaces.

The numbers of elements of lenses constituting the respective lens units, the disposition of the positive and negative lenses, and the like of the zoom lens of Embodiment 2 shown in FIG. 3 are completely the same as those of the zoom lens of Embodiment 1 shown in FIG. 1. However, some lenses of the zoom lens of Embodiment 2 are different in lens construction from the corresponding lenses of the zoom lens of Embodiment 1. In the zoom lens of Embodiment 2, the first lens unit L1 is constituted by a meniscus-shaped negative lens 11 and a meniscus-shaped positive lens 12. The second lens unit L2 is constituted by a meniscus-shaped positive lens 21 having a concave surface directed to the image side, a meniscus-shaped negative lens 22 having a concave surface similarly directed to the image side, a meniscus-shaped negative lens 23, and a positive lens 24 having convex shapes on it both lens surfaces. Then, the positive lens 21 and the negative lens 22 are bonded into a cemented lens, and the negative lens 23 and the positive lens 24 are bonded into a cemented lens. The third lens unit L3 is constituted by a positive lens having a flat surface as a surface provided on the image side.

Figure 5:
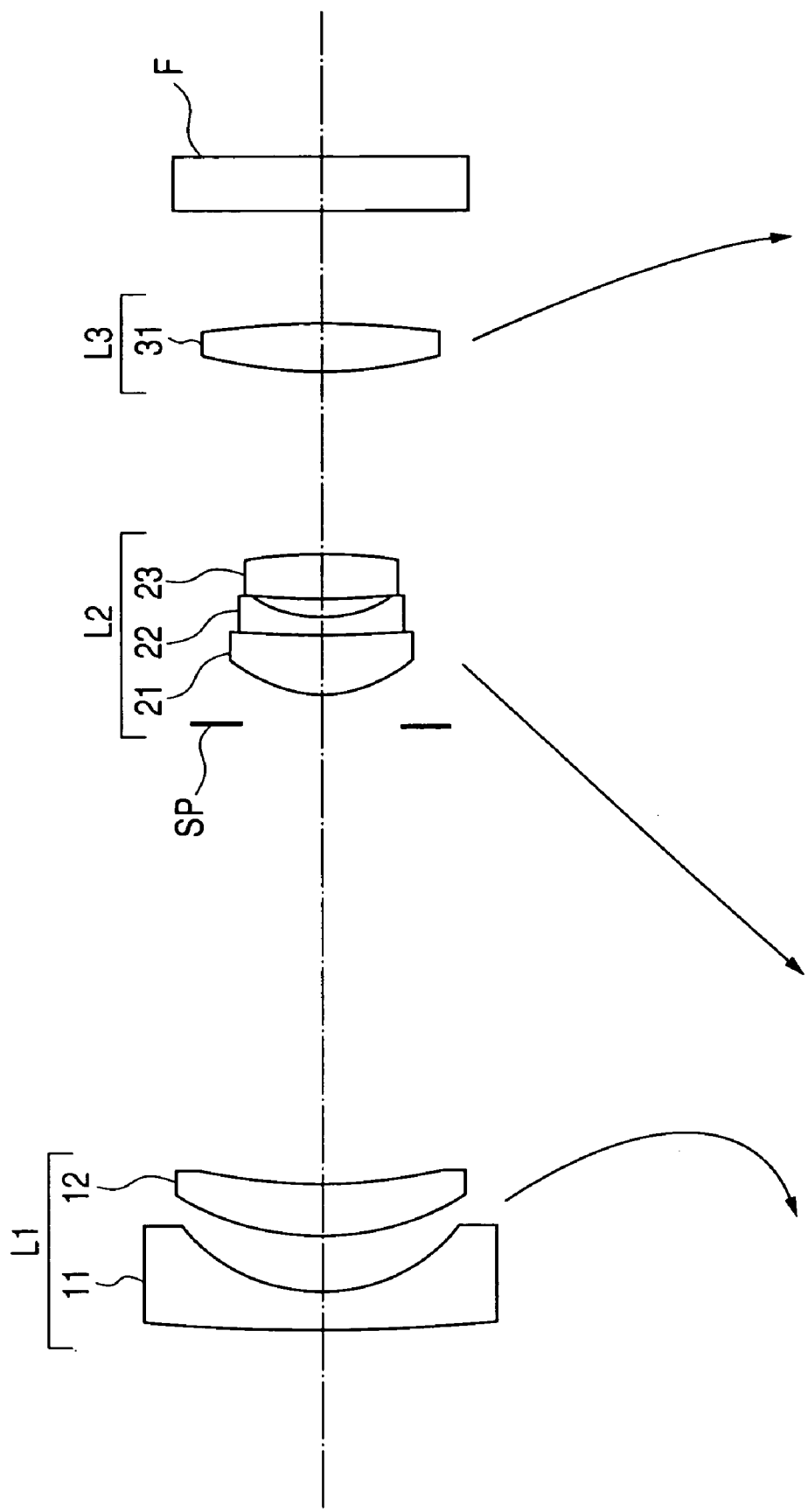
FIG. 5 is a cross sectional view of a zoom lens according to Embodiment 3 of the present invention.
Figure 6A:
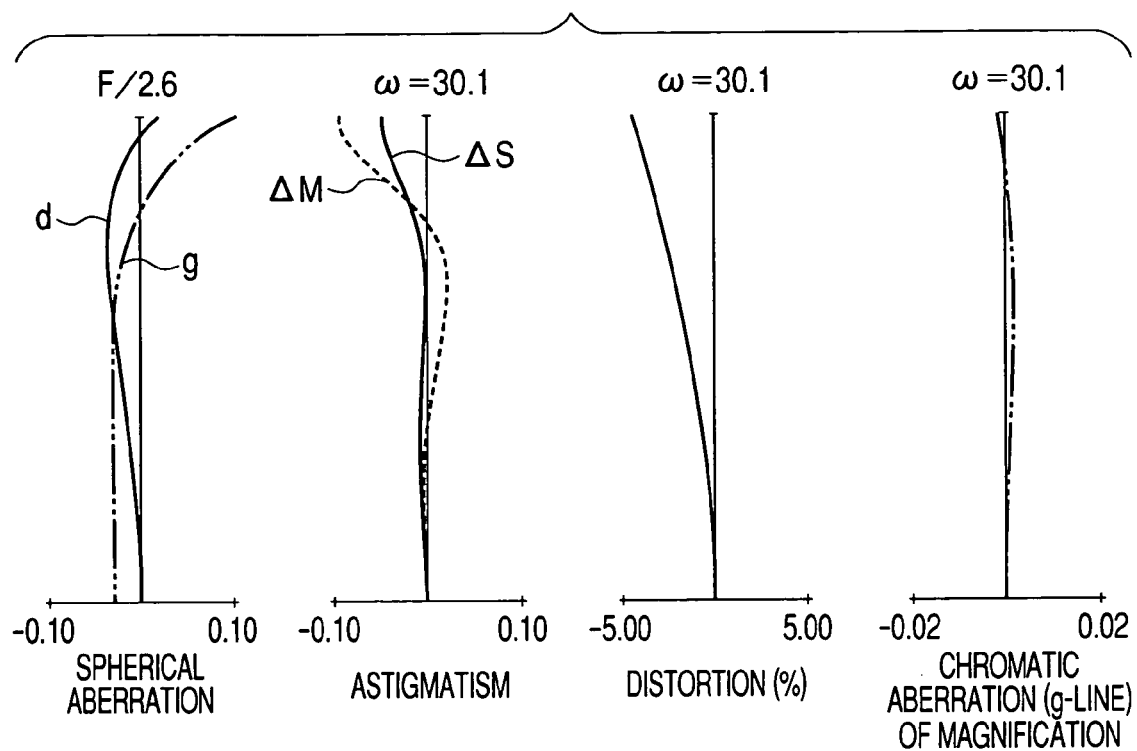
FIGS. 6A and 6B are diagrams showing various aberrations in the zoom lens according to Embodiment 3 of the present invention.
Figure 6B:
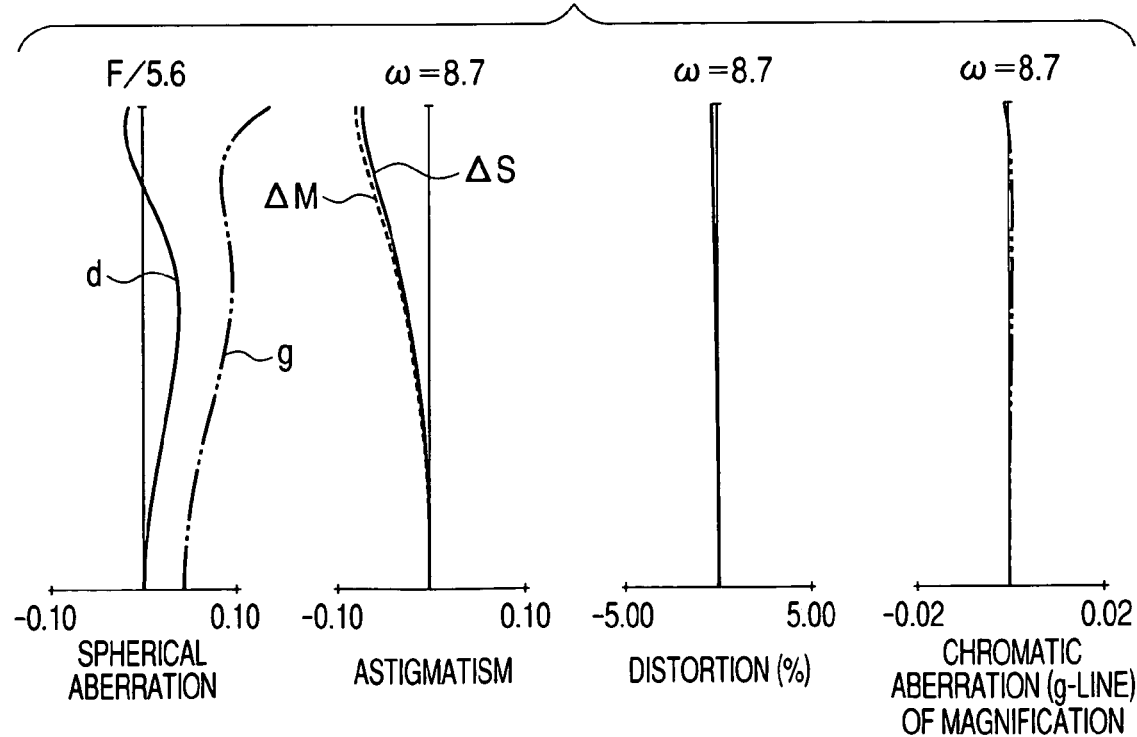

In the zoom lens of Embodiment 3 shown in FIG. 5, the first lens unit L1 having the negative refractive power is constituted by two elements of lenses, i.e., a meniscus-shaped negative lens 11 having a concave surface directed to the image side, and a meniscus-shaped positive lens 12 having a convex surface directed to the object side as in the above embodiments. The second lens unit L2 having the positive refractive power is constituted by a positive lens 21 having a concave surface directed to the image side, a meniscus-shaped negative lens 22 having a concave surface similarly directed to the image side, and a positive lens 23 having convex shapes on its both lens surfaces which are disposed in this order from the object side to the image side. Then, the positive lens 21 and the negative lens 22 are bonded into a cemented lens. The third lens unit L3 having the positive refractive power is constituted by a positive lens 31 having convex shapes on its both lens surfaces.

Figure 7:
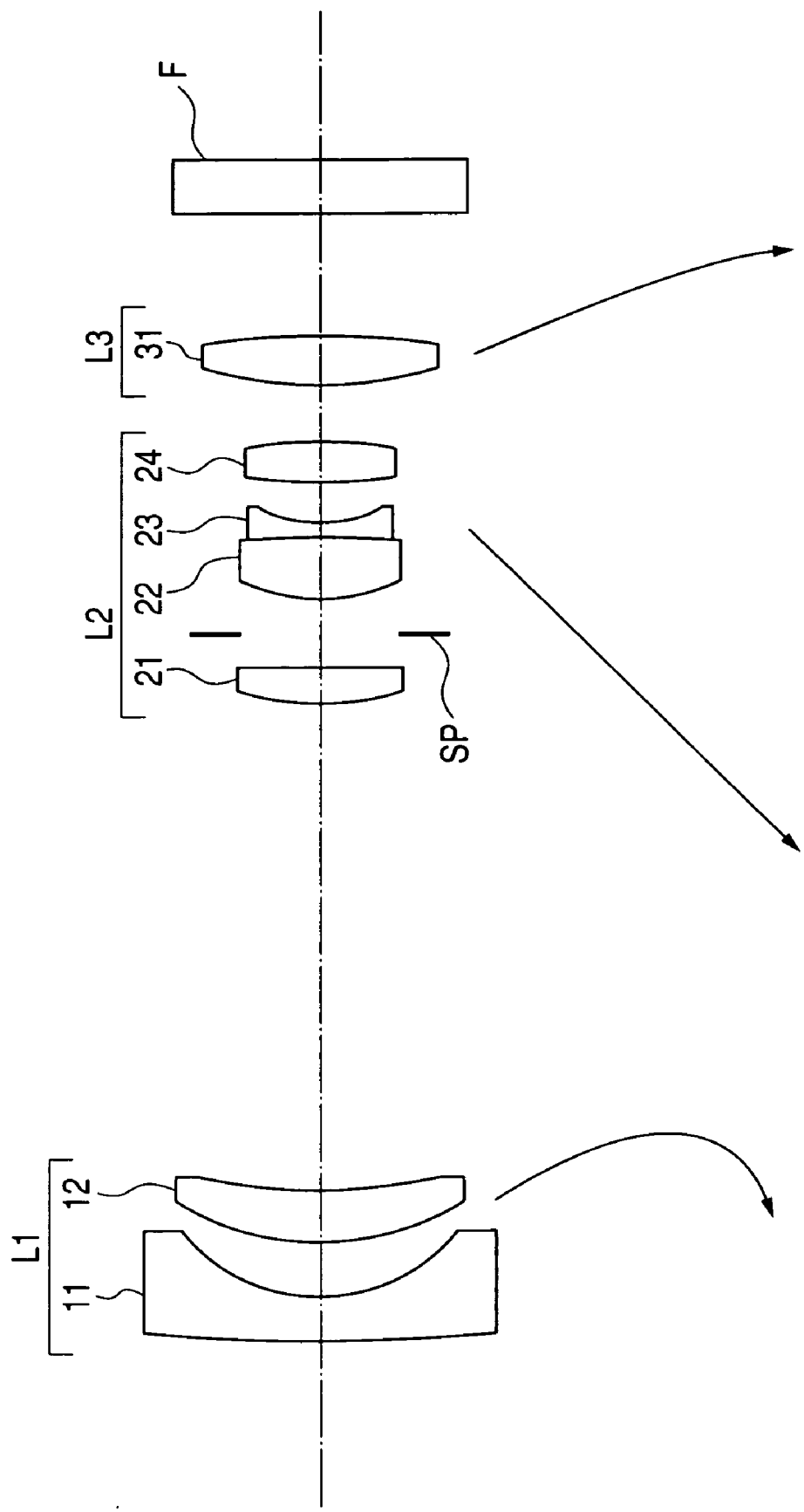
FIG. 7 is a cross sectional view of a zoom lens according to Embodiment 4 of the present invention.
Figure 8A:
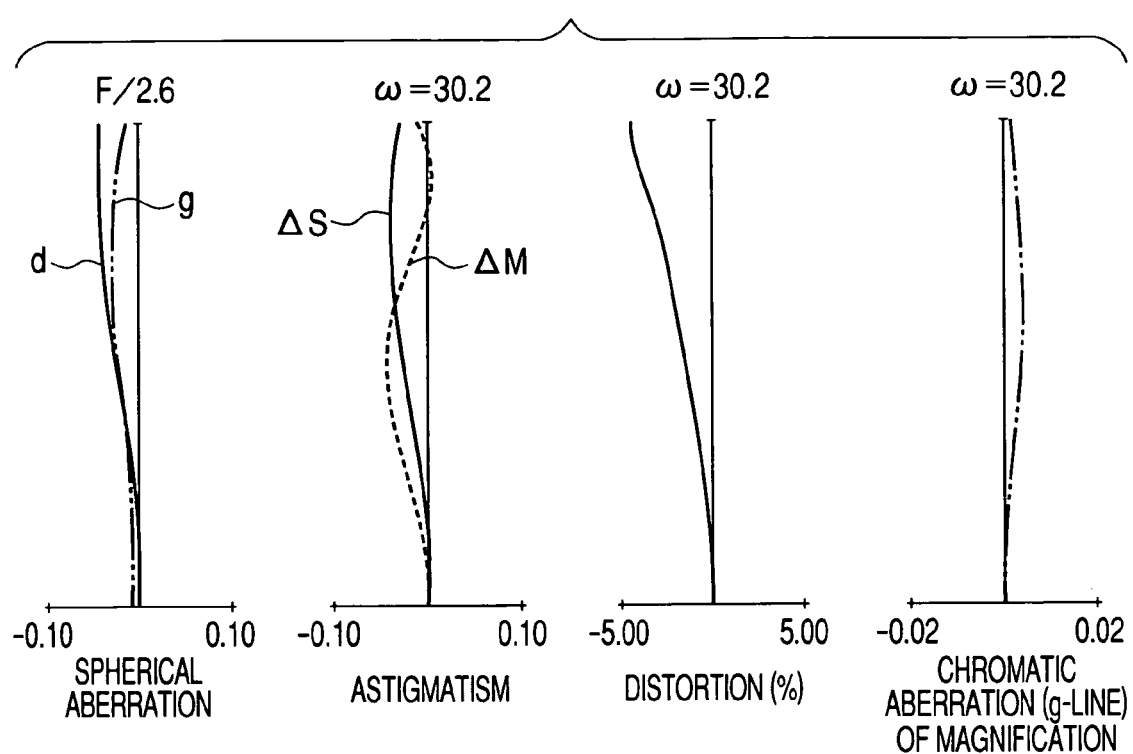
FIGS. 8A and 8B are diagrams showing various aberrations in the zoom lens according to Embodiment 4 of the present invention.
Figure 8B:
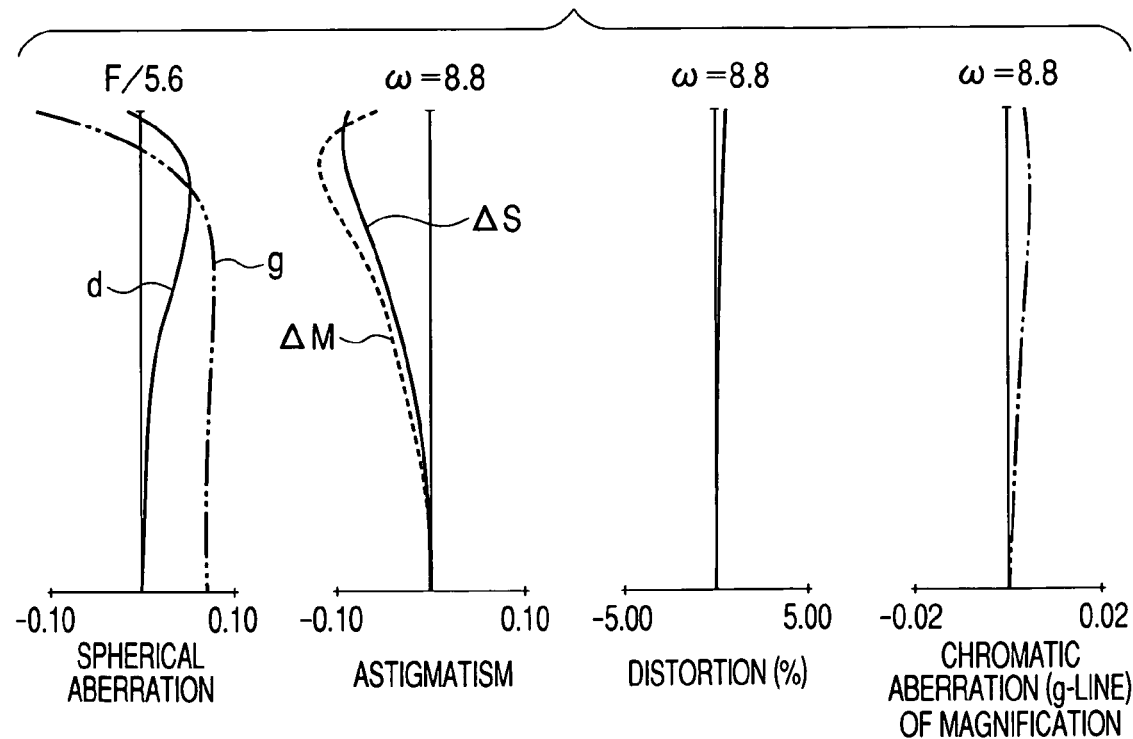

In the zoom lens of Embodiment 4 shown in FIG. 7, the first lens unit L1 having a negative refractive power, similarly to the other embodiments, is constituted by two elements of lenses, i.e., a meniscus-shaped negative lens 11 having a concave surface directed to the image side, and a meniscus-shaped positive lens 12 having a convex surface directed to the object side. The second lens unit L2 having a positive refractive power is constituted by a positive lens 21 having a convex shape on the object side, a positive lens 22 having convex shapes on its both lens surfaces, a negative lens 23 having a concave shapes on its both lens surfaces, and a positive lens 24 having convex shapes on its both lens surfaces which are disposed in this order from the object side to the image side. Then, the positive lens 22 and the negative lens 23 are bonded into a cemented lens. The third lens unit L3 having a positive refractive power is constituted by a positive lens 31 having convex shapes on its both lens surfaces.

As described above, in the zoom lenses of Embodiments 1 to 4, the lens constructions in each of which the disposition of the desired refractive powers and the aberration correction are compatible with each other are adopted for the first to third lens units. As a result, the compactness of the overall lens system is attained while the excellent performance is held.

Next, a general feature over Embodiments 1 to 4 will be described.

The first lens unit L1 has a part for pupil-imaging a principal ray at the center of the aperture stop SP. In particular, since a refraction amount of principal ray is large on the wide angle side, the off axis aberrations, especially, the astigmatism and the distortion aberration are easy to generate.

In Embodiments 1 to 4, the construction having the negative lens and the positive lens is adopted by which an increase in diameter of the lens disposed in a position nearest the object side is suppressed similarly to a case of a normal wide angle lens. Then, if necessary, the lens surface of the meniscus-shaped negative lens 11 on the image side is made an aspherical surface having a shape in which the negative refractive power becomes weak in the lens periphery, thereby balancedly correcting the astigmatism and the distortion aberration. Also, the first lens unit L1 is constructed with the small number of elements of lenses, which contributes to the compactness of the overall lens system.

In addition, each of the lenses constituting the first lens unit L1 has a shape similar to a concentric sphere having a crossing point between the aperture stop SP and the optical axis as a center in order to suppress the generation of the off axis aberration due to the refraction of the principal ray.

Next, the second lens unit L2 has the lens construction in which the positive lens 21 having the convex surface having the stronger refractive power on the object side than that on the image side is disposed in the position nearest the object side in the second lens unit L2 to reduce the angle of refraction of the principal ray emitted through the first lens unit L1, thereby suppressing the generation of the off axis aberrations.

The positive lens disposed in the vicinity of the aperture stop SP is a lens which has the largest height at which an on axis ray travels, and which mainly participates in the correction for the spherical aberration and the coma aberration. Thus, it is preferable that the lens surface, on the object side, of the positive lens disposed in the vicinity of the aperture stop SP of the second lens unit L2 is made an aspherical surface having a shape in which the positive refractive power becomes weak in the lens periphery. In this case, the spherical aberration and the coma aberration become easy to satisfactorily correct.

Moreover, in Embodiments 1 to 4, in order to cope with the reduction of a chromatic aberration amount which is required along with the highly dense pixels and the scale down (shrink) of the cell pitch in the solid-state image pickup element, the cemented lens is disposed in the second lens unit L2, thereby satisfactorily correcting the axial chromatic aberration (longitudinal chromatic aberratin) and the chromatic aberration of magnification.

In addition, in Embodiments 1 and 2, the second lens unit L2 is constituted by the four lenses, i.e., the positive lens 21 and the negative lens 22 bonded into the cemented lens which has the positive refractive power as a whole, the negative lens 23, and the positive lens 24. An advantage of the adoption of that lens construction is that the refractive power of the negative lens component in a so-called triplet type is separated into two components to increase a degree of freedom in terms of the aberration correction for the aberration correcting method based on a single negative lens component as in the triplet type. As a result, it becomes unnecessary in the triplet type to carry out the correction for the off axis flare which is corrected by increasing a glass thickness of a negative lens component, or the correction for the spherical aberration due to two negative air lenses which are provided before and behind of the negative lens component, respectively. Thus, a thickness of the second lens unit L2 on the optical axis can be reduced as compared with the case of the triplet type. This contributes to the shortening of the total optical length and the shortening of the total lens length during collapse.

Next, the third lens unit L3 is constituted by the positive lens 31 having a convex surface provided on the object side, and also functions as a field lens for making the image side telecentric.

Now, when a back focus is sk', a focal length of the third lens L3 is $f_3$, and an imaging magnification of the third lens unit L3 is $\beta_3$, the following relationship is established:

$$sk'=f_3(1-\beta_3)$$

where $\beta_3$ falls within a range of $0<\beta_3<1.0$

Here, if the third lens unit L3 is moved to the image side during the zooming from the wide angle end to the telephoto end, the back focus sk' decreases. Thus, the imaging magnification P3 of the third lens unit L3 increases on the telephoto end.

As a result, the third lens unit L3 can take partial charge of the changing magnification, a movement amount of second lens unit L2 decreases, and hence a space therefor can be saved. This contributes to the miniaturization of the lens system.

When the image-taking is carried out from an object at infinity to a near object using the zoom lens of any one of Embodiments 1 to 4, the excellent performance can be obtained by moving the first lens unit L1 to the object side. However, more desirably, the third lens unit L3 may be moved to the object side.

This reason is that it is possible to prevent an increase in diameter of the front lens which occurs when the focusing is carried out in the first lens unit L1 disposed in a position nearest the object side, and an increase in load of an actuator due to the movement of the heaviest first lens unit L1, and moreover the first and second lens units L1 and L2 can be moved during the zooming operation simply in cooperation with a cum or the like, and hence the simplification and the precision enhancement of the mechanical construction can be attained.

In addition, when the focusing is carried out in the third lens unit L3, the third lens unit L3 is moved to the image side during the zooming from the wide angle end to the telephoto end, whereby the third lens unit L3 can be disposed in a position nearer the image side in the telephoto end having a large focusing movement amount. For this reason, it becomes possible to minimize a total movement amount of third lens unit L3 which is required for the zooming and the focusing. Thus, the compactness of the lens system is attained.

Note that in order to obtain the excellent optical performance at the high zoom ratio or to miniaturize the overall lens system, the zoom lens of each of Embodiments 1 to 4 fulfills the following conditions. At least one of those conditions is fulfilled in the zoom lens of the present invention, whereby it is possible to obtain effects such as the enhancement of the optical performance or the miniaturization of the overall lens system through fulfillment of corresponding conditional expressions.

When a ratio of an imaging magnification of the second lens unit in a tele photo end to an imaging magnification of the second lens unit in a wide angle end is $\beta_{2z}$, and a ratio of an imaging magnification of the third lens unit in a telephoto end to an imaging magnification of the third lens unit in a wide angle end is $\beta_{3z}$, a following condition is fulfilled:

$$2.6<\beta_{2z}/\beta_{3z}<3.5 \qquad (1)$$

Conditional Expression (1) represents the partial charge of the changing magnification between the second and third lens units L2 and L3. If $\beta_{2z}/\beta_{3z}$ becomes smaller than a lower limit, the burden of the changing magnification imposed on the second lens unit L2 becomes insufficient, and the realization of the zoom ratio larger than 3.0 becomes difficult. When a movement amount of third lens unit L3 becomes large, a problem arises in terms of the shortening of the total length. On the other hand, if $\beta_{2z}/\beta_{3z}$ becomes larger than an upper limit, the burden of the changing magnification imposed on the second lens unit L2 becomes too large. Thus, it is required to increase the number of elements of lenses constituting the lens unit in order to distribute the burden of the aberrations within the second lens unit L2, and as a result, the miniaturization becomes difficult.

Conditional Expression (1) may be more preferably set as follows:

$$2.65<\beta_{2z}/\beta_{3z}<3.35 \qquad (1a)$$

Next, in order to decrease the diameter of the front lens and to correct the curvature of the image surface in the peripheral portion of the picture plane in the wide angle end, when a total length of the overall zoom lens system in the wide angle end is $D_w$, a total length of the overall zoom lens system in the telephoto end is $D_t$, and a focal length of the overall zoom lens system in the wide angle end is $f_w$, it is preferable to fulfill the following condition:

$$0.4<(D_t-D_w)/f_w<1.2 \qquad (2)$$

Conditional Expression (2) represents a ratio of the total lens length in the zoom end. If $(D_t-D_w)/f_w$ becomes smaller than a lower limit, an off axis incident luminous flux height in the wide angle end becomes large. Thus, this is against the correction for the image surface aberration in the wide angle end. The outer diameter of the lens is practically determined by the outer diameter of the negative lens disposed in a position nearest the object side. Thus, the increasing of the incident luminous flux height in the wide angle end conflicts with the promotion of reducing the diameter of the lens.

On the other hand, if $(D_t-D_w)/f_w$ becomes larger than an upper limit, a movement amount of first lens unit L1 becomes large. Hence, in a case of the zoom type of Embodiments 1 to 4 having the movement locus projecting toward the image side, the burden imposed on an actuator is large. Then, it is also considered to increase a movement amount of third lens unit L3 to the image side. However, when it is taken into consideration that the various kinds of filters are disposed between the lens system and the image pickup element, it is essential to ensure the back focus. This also becomes an obstacle to the miniaturization.

Conditional Expression (2) may be more preferably set as follows:

$$0.45<(D_t-D_w)/f_w<1.1 \qquad (2a)$$

Next, in order to realize the reduction of the total length after the zoom ratio of about 4 is ensured, when a movement amount (a distance between a position in the wide angle end and a position in the telephoto end) of the third lens unit L3 during the zooming from the wide angle end to the telephoto end is $M_3$, it is preferable to fulfill the following condition:

$$0.3 < M_3/f_w < 0.6 \quad (3)$$

Conditional Expression (3) is a condition related to a movement amount of third lens unit L3. Since if $M_3/f_w$ becomes smaller than a lower limit, the sufficient changing magnification effect in the third lens unit L3 is not obtained, it becomes difficult to attain the high zoom ratio promotion.

On the other hand, if $M_3/f_w$ becomes larger than an upper limit, since a movement amount of third lens unit L3 to the image side becomes large, as described in connection with Conditional Expression (2), this is against the miniaturization.

Conditional Expression (3) may be preferably set as follows:

$$0.34 < M_3/f_w < 0.55 \quad (3a)$$

In order to ensure the sufficient back focus together with the high zoom ratio promotion, when a focal length of the first lens unit L1 is $f_1$, and a focal length of the overall zoom lens system in the telephoto end is ft, it is preferable to fulfill the following condition:

$$0.6 < |f_1/f_t| \leq 0.7 \quad (4)$$

Conditional Expression (4) is a conditional expression for suitably holding the refractive power of the first lens unit L1. If $|f_1/f_t|$ becomes smaller than a lower limit, since the refractive power of the first lens unit L1 becomes strong, it becomes difficult to correct the distortion due to a difference of the zooming and the fluctuation due to the image surface curvature. On the other hand, if $|f_1/f_t|$ becomes larger than an upper limit, it becomes difficult to ensure the back focus.

Next, numerical data of Numerical Embodiments 1 to 4 corresponding to Embodiments 1 to 4, respectively, will be shown. In Numerical Embodiments 1 to 4, reference symbol f designates a focal length, reference symbol Fno designates an F number, and reference symbol ω designates a half angle of view. Reference symbol i designates the order numbered from the object side, reference symbol $R_i$ designates a radius of curvature of an i-th surface, reference symbol $D_i$ designates an on axis distance between an i-th surface and an (i+1)-th surface, and reference symbols $N_i$ and $v_i$ designate a refractive index and an Abbe's number of a material between the i-th surface and the (i+1)-th surface with the d line as a reference, respectively.

When a traveling direction of the light is made positive, x is a displacement amount from a surface vertex in an optical axis direction, h is a height from an optical axis in a direction vertical to the optical axis, R is a near axis radius of curvature, K is a conic constant, and B to E are aspherical coefficients, respectively, an aspherical surface shape is expressed as follows:

$$x = \frac{(1/R)h^2}{1 + \sqrt{\{1 - (1+k)(h/R)^2\}}} + Bh^4 + Ch^6 + Dh^8 + Eh^{10}$$

where "D±Z" means "x $10^{\pm Z}$".

In addition, TABLE 1 shows a relationship between Conditional Expressions (1) to (4) described above and Numerical Embodiments.

NUMERAL EXAMPLE 1

| f = 6.03–22.94 | | Fno = 2.7–5.6 | | 2ω = 61.0°–17.6° | |
|---|---|---|---|---|---|
| R1 = | 85.239 | D1 = | 1.30 | N1 = | 1.80238 | v1 = | 40.2 |
| R2 = | 5.262 | D2 = | 1.62 | N2 = | 1 | v2 = | 1 |
| R3 = | 9.055 | D3 = | 1.80 | N3 = | 1.84666 | v3 = | 23.9 |
| R4 = | 25.992 | D4 = | Variable | N4 = | 1 | v4 = | 1 |
| R5 = | ∞ | D5 = | 0.64 | N5 = | 1 | v5 = | 1 |
| R6 = | 4.478 | D6 = | 2.00 | N6 = | 1.80238 | v6 = | 40.8 |
| R7 = | −26.613 | D7 = | 0.50 | N7 = | 1.69895 | v7 = | 30.1 |
| R8 = | 3.659 | D8 = | 0.70 | N8 = | 1 | v8 = | 1 |
| R9 = | 12.478 | D9 = | 0.50 | N9 = | 1.69895 | v9 = | 30.1 |
| R10 = | 6.194 | D10 = | 1.80 | N10 = | 1.58313 | v10 = | 59.4 |
| R11 = | −21.779 | D11 = | Variable | N11 = | 1 | v11 = | 1 |
| R12 = | 15.944 | D12 = | 1.30 | N12 = | 1.48749 | v12 = | 70.2 |
| R13 = | −139.647 | D13 = | Variable | N13 = | 1 | v13 = | 1 |
| R14 = | ∞ | D14 = | 2.00 | N14 = | 1.51633 | v14 = | 64.1 |
| R15 = | ∞ | | | | | | |

| | Focal Length | | |
|---|---|---|---|
| Variable Interval | 6.03 | 11.71 | 22.94 |
| D4 | 16.50 | 4.67 | 0.69 |
| D11 | 5.17 | 8.96 | 24.62 |
| D13 | 3.95 | 5.77 | 1.00 |

Aspherical coefficients
Second surface k = −1.71216
B = 8.94917D−04   C = −5.38070D−06   D = 1.191609D−08   E = 1.11975D−09

Sixth surface k = −3.42673D−01
B = −5.51323D−05   C = 1.21893D−06   D = 3.54443D−08   E = −3.54915D−09

NUMERICAL EXAMPLE 2

| f = 6.09–24.17 | | Fno = 2.8–5.7 | | 2ω = 60.5°–16.7° | | |
|---|---|---|---|---|---|---|
| R1 = | 186.908 | D1 = | 1.70 | N1 = 1.69350 | ν1 = | 53.3 |
| R2 = | 5.400 | D2 = | 1.98 | N2 = 1 | ν2 = | 1 |
| R3 = | 9.188 | D3 = | 2.00 | N3 = 1.76182 | ν3 = | 26.5 |
| R4 = | 20.411 | D4 = | Variable | N4 = 1 | ν4 = | 1 |
| R5 = | ∞ | D5 = | 2.00 | N5 = 1 | ν5 = | 1 |
| R6 = | 5.183 | D6 = | 2.20 | N6 = 1.80610 | ν6 = | 40.7 |
| R7 = | 23.821 | D7 = | 0.50 | N7 = 1.69895 | ν7 = | 30.1 |
| R8 = | 4.549 | D8 = | 0.60 | N8 = 1 | ν8 = | 1 |
| R9 = | 9.640 | D9 = | 0.50 | N9 = 1.80610 | ν9 = | 33.3 |
| R10 = | 4.317 | D10 = | 2.60 | N10 = 1.58313 | ν10 = | 59.4 |
| R11 = | −23.713 | D11 = | Variable | N11 = 1 | ν11 = | 1 |
| R12 = | 17.314 | D12 = | 1.60 | N12 = 1.48749 | ν12 = | 70.2 |
| R13 = | ∞ | D13 = | Variable | N13 = 1 | ν13 = | 1 |
| R14 = | ∞ | D14 = | 2.00 | N14 = 1.51633 | ν14 = | 64.1 |
| R15 = | ∞ | | | | | |

| | Focal Length | | |
|---|---|---|---|
| | 6.09 | 12.21 | 24.17 |
| Variable Interval | | | |
| D4 | 19.00 | 6.54 | 0.78 |
| D11 | 5.65 | 13.19 | 28.27 |
| D13 | 3.96 | 3.62 | 1.34 |

Aspherical coefficients
Second surface k = −2.47397
B = 1.39245D−03   C = −1.76536D−05   D = 1.93211D−07

Sixth surface k = −7.60196D−01
B = 3.94992D−04   C = 8.06311D−06   D = 1.52192D−07   E = 2.302745D−09

NUMERICAL EXAMPLE 3

| f = 6.12–23.0 | | Fno = 2.6–5.6 | | 2ω = 60.2°–17.5° | | |
|---|---|---|---|---|---|---|
| R1 = | 46.462 | D1 = | 1.30 | N1 = 1.68343 | ν1 = | 52.4 |
| R2 = | 4.790 | D2 = | 1.90 | N2 = 1 | ν2 = | 1 |
| R3 = | 7.607 | D3 = | 1.60 | N3 = 1.76182 | ν3 = | 26.5 |
| R4 = | 13.722 | D4 = | Variable | N4 = 1 | ν4 = | 1 |
| R5 = | ∞ | D5 = | 0.64 | N5 = 1 | ν5 = | 1 |
| R6 = | 4.715 | D6 = | 2.25 | N6 = 1.80238 | ν6 = | 40.7 |
| R7 = | 31.015 | D7 = | 0.55 | N7 = 1.80518 | ν7 = | 25.4 |
| R8 = | 4.090 | D8 = | 0.70 | N8 = 1 | ν8 = | 1 |
| R9 = | 14.127 | D9 = | 1.45 | N9 = 1.60311 | ν9 = | 60.6 |
| R10 = | −16.232 | D10 = | Variable | N10 = 1 | ν10 = | 1 |
| R11 = | 17.960 | D11 = | 1.60 | N11 = 1.48749 | ν11 = | 70.2 |
| R12 = | −35.631 | D12 = | Variable | N12 = 1 | ν12 = | 1 |
| R13 = | ∞ | D13 = | 2.00 | N13 = 1.54427 | ν13 = | 70.6 |
| R14 = | ∞ | | | | | |

| | Focal Length | | |
|---|---|---|---|
| | 6.12 | 11.84 | 23.00 |
| Variable Interval | | | |
| D4 | 16.00 | 4.29 | 1.52 |
| D10 | 6.21 | 9.31 | 27.30 |
| D12 | 3.76 | 6.74 | 1.67 |

-continued

Aspherical coefficients
Second surface k = −1.58884
B = 1.21851D−03    C = −5.16576D−06    D = 1.94233D−07

Sixth surface k = −3.68649D−01
B = 1.42548D−05    C = 3.14446D−06    D = −2.37539D−09    E = 5.32019D−09

NUMERICAL EXAMPLE 4

| f = 6.09–22.98 | | Fno = 2.6–5.6 | | | | 2ω = 60.5°–17.6° | |
|---|---|---|---|---|---|---|---|
| R1 = | 133.316 | D1 = | 1.70 | N1 = | 1.80238 | ν1 = | 40.8 |
| R2 = | 5.400 | D2 = | 1.79 | N2 = | 1 | ν2 = | 1 |
| R3 = | 9.671 | D3 = | 2.00 | N3 = | 1.80518 | ν3 = | 25.4 |
| R4 = | 43.024 | D4 = | Variable | N4 = | 1 | ν4 = | 1 |
| R5 = | 9.859 | D5 = | 1.20 | N5 = | 1.60311 | ν5 = | 60.6 |
| R6 = | ∞ | D6 = | 1.20 | N6 = | 1 | ν6 | 1 |
| R7 = | ∞ | D7 = | 1.20 | N7 = | 1 | ν7 = | 1 |
| R8 = | 6.288 | D8 = | 2.30 | N8 = | 1.7433 | ν8 = | 49.2 |
| R9 = | −20.810 | D9 = | 0.50 | N9 = | 1.76182 | ν9 = | 26.5 |
| R10 = | 4.665 | D10 = | 1.50 | N10 = | 1 | ν10 = | 1 |
| R11 = | 34.534 | D11 = | 1.20 | N11 = | 1.84666 | ν11 = | 23.9 |
| R12 = | −93.876 | D12 = | Variable | N12 = | 1 | ν12 = | 1 |
| R13 = | 16.453 | D13 = | 1.60 | N13 = | 1.48749 | ν13 = | 70.2 |
| R14 = | −42.191 | D14 = | Variable | N14 = | 1 | ν14 = | 1 |
| R15 = | ∞ | D15 | 2 | N15 = | 1.51633 | ν15 = | 64.1 |
| R16 = | ∞ | D16 | 0.19936 | N16 = | 1 | ν16 = | 1 |

| | Focal Length | | |
|---|---|---|---|
| | 6.09 | 11.76 | 22.98 |
| Variable Interval | | | |
| D4 | 17.00 | 5.73 | 0.49 |
| D12 | 2.18 | 8.75 | 21.54 |
| D14 | 3.95 | 3.47 | 0.59 |

Aspherical coefficients
Second surface k = −2.32625
B = 1.30212D−03    C = −2.35872D−05    D = 6.52041D−07    E = −1.01189D−08

Eighth surface k = −9.36521D−01
B = 3.02866D−04    C = −1.37859D−06

TABLE 1

| | Embodiment 1 | Embodiment 2 | Embodiment 3 | Embodiment 4 |
|---|---|---|---|---|
| Conditional Expression (1) | 2.98 | 3.32 | 3.02 | 2.67 |
| Conditional Expression (2) | 0.6 | 0.72 | 1.08 | 0.47 |
| Conditional Expression (3) | 0.49 | 0.43 | 0.34 | 0.55 |
| Conditional Expression (4) | 0.64 | 0.6 | 0.61 | 0.7 |

Next, an embodiment of an image pickup apparatus using the zoom lens of any one of Embodiments 1 to 4 as an image taking optical system will be described with reference to FIG. 9.

Figure 9:
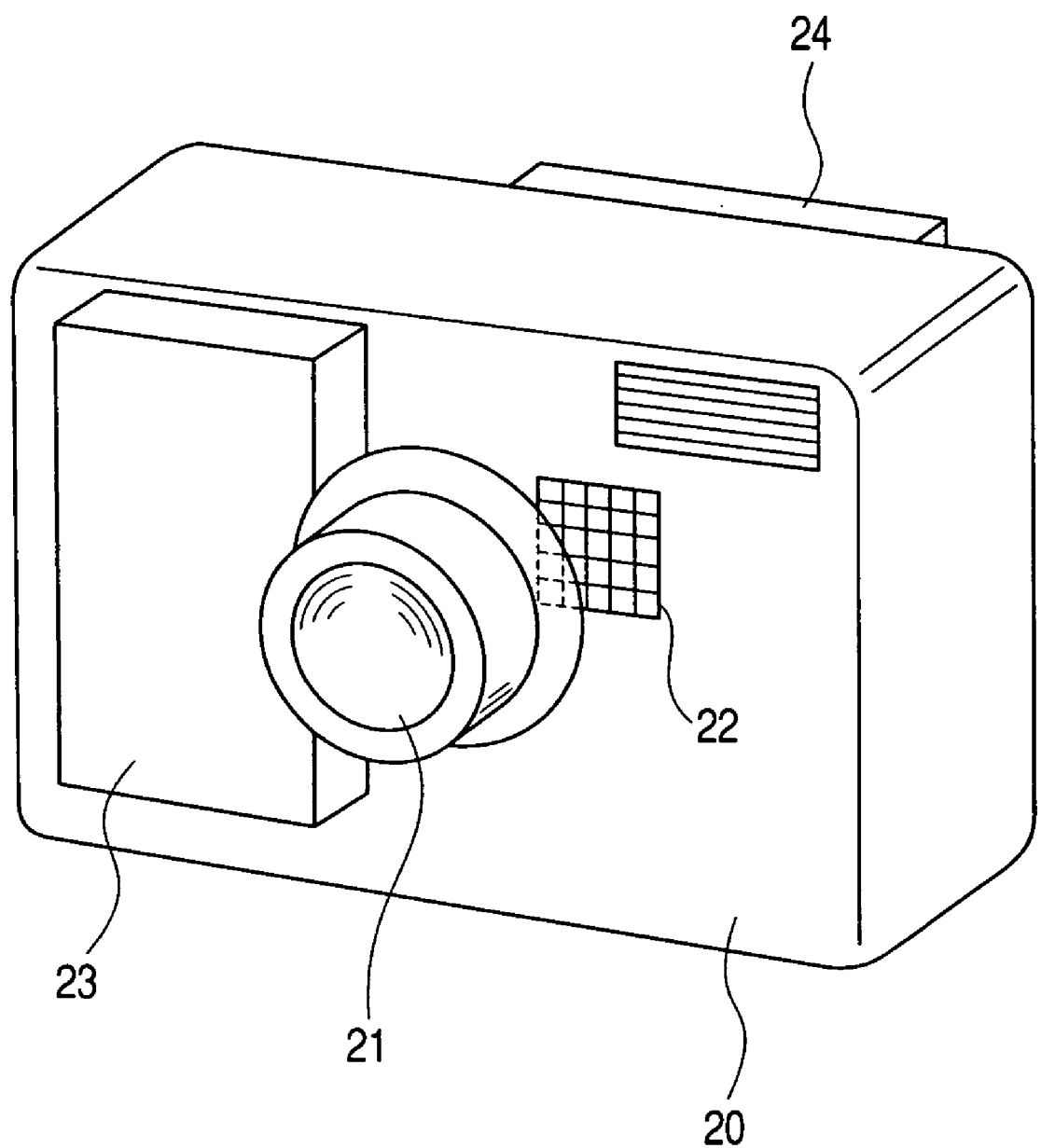
FIG. 9 is a schematic perspective view of a main portion of a digital still camera.

FIG. 9 is a schematic perspective view showing an example in which the zoom lens system of the present invention is used in a digital still camera. In FIG. 9, reference numeral 20 designates a camera main body, reference numeral 21 designates an image taking optical system constituted by any one of the zoom lenses described in Embodiments 1 to 4, reference numeral 22 designates a solid-state image pickup element (photoelectric conversion element) such as a CCD sensor or a CMOS sensor which is built in the camera main body 20 and which serves to receive light of an object image formed by the image taking optical system 21, reference numeral 23 designates a memory for recording therein information which is obtained through the photoelectric conversion by the solid-state image pickup element 22 in correspondence to the object image, and reference numeral 24 designates a finder which is constituted by a liquid crystal display panel or the like and with which a user observes the object image formed on the solid-state image pickup element 22.

The zoom lens system of the present invention is applied to the image pickup apparatus such as a video camera or a digital still camera in such a manner, whereby it is possible to realize a compact image pickup apparatus having high optical performance.

This application claims priority from Japanese Patent Application No. 2004-167214 filed Jun. 4, 2004, which is hereby incorporated by reference herein.

What is claimed is:

1. A zoom lens system, comprising in an order from an object side to an image side:

a first lens unit having a negative optical power;

a second lens unit having a positive optical power; and a third lens unit having a positive optical power, wherein during zooming, each distance among the first, second, and third lens units changes, and when a ratio of an imaging magnification of the second lens unit in a telephoto end to an imaging magnification of the second lens unit in a wide angle end is $\beta_{2z}$, and a ratio of an imaging magnification of the third lens unit in a telephoto end to an imaging magnification of the third lens unit in a wide angle end is $\beta_{3z}$, a following condition is fulfilled:

$$2.6 < \beta_{2z}/\beta_{3z} < 3.5.$$

2. A zoom lens system according to claim 1, wherein when a total length of the zoom lens system in the wide angle end is $D_w$, a total length of the zoom lens system in the telephoto end is $D_t$, and a focal length of the zoom lens system in the wide angle end is $f_w$, a following condition is fulfilled:

$$0.4 < (D_t - D_w)/f_w < 1.2.$$

3. A zoom lens system according to claim 1, wherein during the zooming from the wide angle end to the telephoto end, the third lens unit moves to be located on the image side in the telephoto end for the wide angle end, and when a movement amount of third lens unit during the zooming from the wide angle end to the telephoto end is $M_3$, and a focal length of the zoom lens system in the wide angle end is $f_w$, a following condition is fulfilled:

$$0.3 < |M_3|/f_w < 0.6.$$

4. A zoom lens system according to claim 1, wherein during the zooming from the wide angle end to the telephoto end, the first lens unit moves to draw a locus convex toward the image side, the second lens unit monotonously moves to the object side, and the third lens unit moves to the image side.

5. A zoom lens system according to claim 1, wherein the first lens unit consists of a negative lens and a positive lens, and the negative lens is an aspherical surface lens.

6. A zoom lens system according to claim 1, wherein when a focal length of the first lens unit is $f_1$, and a focal length of the zoom lens system in the telephoto end is $f_t$, a following condition is fulfilled:

$$0.6 < |f_1/f_t| \leq 0.7.$$

7. A zoom lens system according to claim 1, wherein the second lens unit has a cemented lens which is obtained by bonding a positive lens and a negative lens disposed on an image side of the positive lens to each other.

8. A zoom lens system according to claim 1, wherein the zoom lens system forms an image on a photoelectric conversion element.

9. An image pickup apparatus, comprising:

a zoom lens system according to claim 1; and a photoelectric conversion element for receiving light of an image formed by the zoom lens system.

* * * * *